United States Patent [19]

Tugal et al.

[11] Patent Number: 4,862,697
[45] Date of Patent: Sep. 5, 1989

[54] CRYOPUMP WITH VIBRATION ISOLATION

[75] Inventors: Halil Tugal, Windham, N.H.; Bruce R. Bent, Scituate, Mass.

[73] Assignee: Helix Technology Corporation, Waltham, Mass.

[21] Appl. No.: 210,724

[22] Filed: Jun. 23, 1988

Related U.S. Application Data

[63] Continuation-in-part of Ser. No. 931,417, Nov. 14, 1986, which is a continuation-in-part of Ser. No. 839,693, Mar. 3, 1986, abandoned, which is a continuation of Ser. No. 779,786, Sep. 24, 1985, abandoned.

[51] Int. Cl.$^4$ .............................................. B01D 7/02
[52] U.S. Cl. ..................................... 62/55.5; 62/295; 55/269; 248/636; 248/638; 417/363; 417/901
[58] Field of Search ............... 62/55.5, 100, 268, 295; 55/269; 248/559, 636, 638; 417/363, 901

[56] References Cited

U.S. PATENT DOCUMENTS

| | | | |
|---|---|---|---|
| 3,125,858 | 3/1964 | Baittinger | 61/53 |
| 3,345,245 | 10/1967 | Hanusa | 161/119 |
| 3,369,826 | 2/1968 | Boosey et al. | 285/47 |
| 3,894,403 | 7/1975 | Longsworth | 62/55 |
| 3,952,777 | 4/1976 | Uhlig | 138/149 |
| 4,352,643 | 10/1982 | Iijima | 417/313 |
| 4,363,217 | 12/1982 | Venuti | 62/55.5 |
| 4,394,819 | 7/1983 | Averill | 62/514 |
| 4,483,425 | 11/1984 | Newman | 248/559 |
| 4,494,634 | 1/1985 | Kato | 248/559 |
| 4,526,015 | 7/1985 | Laskaris | 62/514 |
| 4,539,822 | 9/1985 | Sundquist | 62/55.5 |
| 4,595,166 | 6/1986 | Kurokawa | 248/638 |
| 4,783,968 | 11/1988 | Higham et al. | 62/16 |

FOREIGN PATENT DOCUMENTS

| | | |
|---|---|---|
| 827144 | 1/1952 | Fed. Rep. of Germany . |
| 938812 | 2/1956 | Fed. Rep. of Germany . |
| 855451 | 11/1960 | United Kingdom . |

OTHER PUBLICATIONS

Sov. Phys. Acoust. 26(4); "Damping of Tubes by a Constrained Coating"; Vinogradov et al.; Jul.-Aug. 1980; pp. 328-330.
Sov. Phys. Acoust. 26(4); Virbration Damping of Tubes by Vibration-Absorbing Coatings; Zeinetdinova et al.; Jul.-Aug. 1980; pp. 312-315.
Acta Technica Csav;"Vibration Absorbers for the Stays of Guyed Masts"; Fischer; 1987; pp. 95-111.

Primary Examiner—Ronald C. Capossela
Attorney, Agent, or Firm—Hamilton, Brook, Smith & Reynolds

[57] ABSTRACT

A vibration isolator particularly suited to isolating a closed cycle refrigerator in a cryopump includes two bellows covered with vibration damping material and separated by an intermediate mass. The damping material fills the spaces between corrugations of the bellows and is bonded to the bellows. A dynamic absorber operates to attenuate vibrations of a partucular frequency from being transmitted into the refrigerator from a drive unit of the cryopump.

17 Claims, 10 Drawing Sheets

CRYOPUMP WITH VIBRATION ISOLATION

This is a continuation in part of U.S. patent application Ser. No. 931,417 filed on Nov. 14, 1986 by Halil Tugal which is a continuation-in-part of U.S. patent application Ser. No. 839,693 filed Mar. 3, 1986, by Halil Tugal and Peter W. Gaudet abandoned which is a continuation of U.S. patent application Ser. No. 779,786 filed on Sept. 24, 1985, by Halil Tugal and Peter W. Gaudet now abandoned.

BACKGROUND

Cryogenic vacuum pumps, or cryopumps, cooled by closed cycle refrigerators have gained wide acceptance in recent years for high vacuum applications. A cryopump typically includes a vacuum vessel, enclosing a cryopump chamber, which can be mounted to a work chamber which is to be evacuated. A cryogenic refrigerator is mounted to the vacuum vessel and a cold finger of the refrigerator extends into the vessel. The refrigerator typically operates on the Gifford-MacMahon cycle. High pressure refrigerant gas, such as helium, is introduced into the cold finger and there displaced and expanded by movement of a reciprocating displacer/regenerator. Cryopanels mounted to the cold finger within the cryopump chamber are cooled to cryogenic temperatures. Gases from the work chamber condense on those cryopanels and, with the gases thus removed from the work chamber, its pressure is reduced to a high vacuum in the order of $10^{-7}$ torr.

Because a cryopump is a capture system in which no moving parts are exposed to the vacuum environment, it is extremely clean. Cryopumps are also fast and efficient. Cryopumps cooled by closed cycle refrigerators are particularly convenient and economical because there is no need for an expendable cryogen such as liquid nitrogen. The refrigeration is developed in the cold finger which protrudes into the vacuum vessel. Cryopumps driven by closed cycle refrigerators have suffered one disadvantage which has made such cryopumps unsuitable for certain applications. In such applications as electron microscopes and electron beam lithography, vibrations generated in a closed cycle refrigerator can be detrimental.

In a conventional cryopump, the closed cycle refrigerator is mounted directly to the cryopump vacuum vessel. To minimize the vibration translated to the work chamber, systems have been proposed in which the refrigerator is vibration isolated from the work chamber. The vibration isolator may be positioned between the cryopump chamber and the work chamber or between the closed cycle refrigerator and the cryopump chamber. In order to provide for relative movement between the vibrating refrigerator and the work chamber, while still providing a vacuum seal between the refrigerator and the work chamber, a bellows is utilized. The bellows may surround the flow path between the cryopump chamber and the work chamber or it may surround the cold finger of the cryogenic refrigerator.

One form of isolator has been described by Guy S. Venuti in U.S. Pat. No. 4,363,217 and in "Use of Vibration Isolated Cryopumps to Improve Electron Microscopes and Electron Beam Lithography Units", *Journal of Vacuum Science Technology*, A1 (2) April-June 1983, pages 237-240. The closed cycle refrigerator is suspended from the cryopump chamber by the bellows, and the bellows serve as an isolating spring. As a vacuum is created in the cryopump chamber, the difference in pressure, between the vacuum and ambient pressure, across the bellows tends to collapse the bellows. Collapse of the bellows is prevented by the suspended weight of the refrigerator and an additional mass mounted to the refrigerator. In such a system, the spring action of the bellows isolates the cryopump chamber from refrigerator vibration frequencies above a resonant frequency. Below the resonant frequency there is no isolation, and at the resonant frequency vibrations are actually amplified. By selection of the spring constant of the bellows and the mass suspended by the bellows, the isolator system can be designed to have a resonant frequency below the most significant vibration frequencies and thus effectively isolate the refrigerator from the work chamber.

In another form of vibration isolator which has been used with both cryopumps and turbomolecular pumps, the bellows is provided for vacuum sealing, and elastomer vibration isolators are positioned about the bellows between the refrigerator and the work chamber. Such a system relies on isolation and damping of vibration amplitudes by the elastomer isolators which also prevent collapse of the bellows. An example can be found in U.S. Pat. No. 4,539,822 to Sundquist. In a similar system, an elastomeric ring surrounds the bellows. A metal band around the elastomeric isolator ring prevents the collapse of the bellows and the cryopump vessel under vacuum. The elastomeric isolator ring provides both vibration isolation and damping of vibration amplitudes.

DISCLOSURE OF THE INVENTION

The present invention relates to a vibration isolator placed between a cryopump and a work chamber for eliminating vibration transferred to the chamber. Preferably, two isolators are connected in series and are separated by an intermediate mass. The two isolators provide for a two degree of freedom system which increases vibration attenuation. It is preferred that the first of the two isolators forms a vacuum housing about cryopanels and that the other isolator be mounted between the first isolator and a refrigerator which cools the cryopanels. The intermediate mass preferably comprises weighted flanges used to mount the two isolators together.

In accordance with one aspect of the present invention, a vibration isolator comprises a cylindrical bellows having circumferential corrugations. An elastic vibration damping material fills the spaces between the corrugations of the bellows to prevent collapse of the bellows and to isolate and damp vibrations transmitted through the bellows. The dynamic shear modulus and the dynamic Young's modulus of the damping material are substantially less than that of the bellows in order to maintain isolation as the bellows is collapsed against the material. The bellows has high dynamic moduli and provides rigidity against transverse bowing of the assembly but its corrugated shape provides good isolation. The dynamic shear modulus of the material of the bellows should be at least on the order of $10^{11}$ dynes/square centimeter and that of the damping material should be less than $10^7$ dynes/cm$^2$. The damping material can provide high or low damping depending on the frequencies and amplitude of the primary vibrations of concern.

A metal bellows provides the preferred surface for exposure to the vacuum environment. It is impermeable to gases and minimizes outgasing. The metal bellows can be of welded diaphragms or it can be a formed convoluted bellows.

A preferred embodiment of the invention utilizes a dynamic absorber mounted on the cryopump for improved vibration isolation. This dynamic absorber vibrates out of phase with a vibration generated by the motor and displacer system that is used to cool the gas of the cryopump.

A cantilever beam mounted on or adjacent the motor and the bellows system is one embodiment of the dynamic absorber. A mass affixed, at the free end of the beam can be adjusted so that the natural frequency of vibration of the absorber can be tuned to the particular frequency generated by the operation of the drive unit of the cryopump which requires attenuation.

BRIEF DESCRIPTION OF THE DRAWINGS

The foregoing and other objects, features, and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
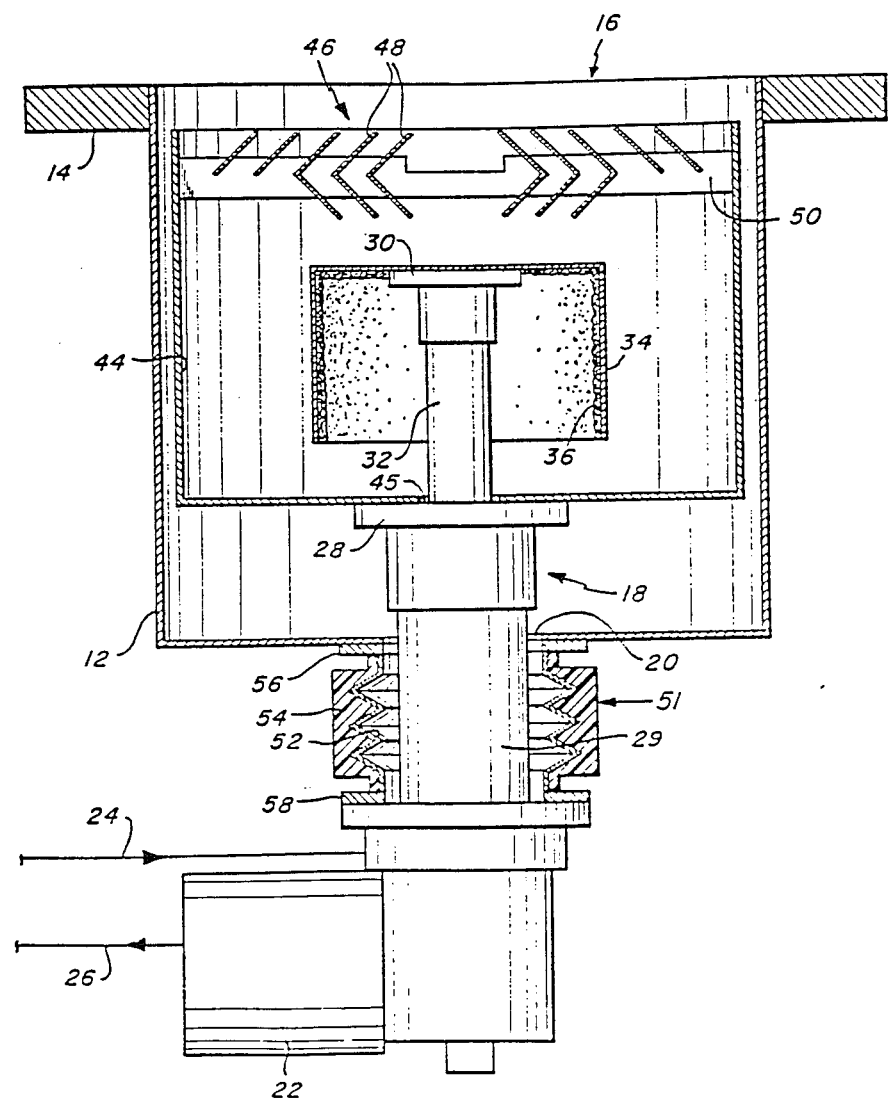
FIG. 1 is a longitudinal cross sectional view of a cryopump provided with a welded bellows isolator between the refrigerator and the cryopump chamber.

The cryopump of each of the Figures comprises a vacuum vessel 12 which is to be mounted to the wall of a work chamber along a flange 14. A front opening 16 in the vessel 12 communicates with a circular opening in a work chamber. Alternatively, the cryopump assembly may protrude into the chamber and a vacuum seal be made at a rear flange. A two stage cold finger 18 of a refrigerator protrudes into the vessel 12 through an opening 20. In this case, the refrigerator is a Gifford-MacMahon refrigerator such as disclosed in U.S. Pat. No. 3,218,815 to Chellis et al., but others may be used. A two stage displacer in the cold finger 18 is driven by a motor 22. With each cycle, helium gas introduced into the cold finger under pressure through line 24 is expanded and thus cooled and then exhausted through line 26. A first stage heat sink, or heat station, 28 is mounted at the cold end of the first stage 29 of the refrigerator. Similarly, a heat sink 30 is mounted to the cold end of the second stage 32.

The primary pumping surface is, in this system, an inverted cup 34 mounted to the heat sink 30. A low temperature absorbent 36 such as charcoal particles is epoxied to the inside surface area of the cup.

A cup shaped radiation shield 44 is mounted to the first stage, high temperature sink 28. The second stage of the cold finger extends through an opening 45 in that radiation shield. This radiation shield 44 surrounds the second stage array to the rear and sides to minimize heating of the array by radiation. Preferably the temperature of this radiation shield is less than about 120° K.

A frontal cryopanel array 46 serves as both a radiation shield for the primary cryopanel and as a cryopumping surface for higher boiling temperature gases such as water vapor. This array comprises louvers 48 joined by spokes 50. The frontal array 46 is mounted to the radiation shield 44, and the shield both supports the frontal array and serves as the thermal path from the heat sink 28 to that array.

In a conventional cryopump, the refrigerator is connected directly to the vacuum vessel 12. In the system of FIG. 1, however, the refrigerator is mounted to the vessel through a vibration isolator 51. The vibration isolator 51 includes a bellows 52 which in FIG. 1 is a welded diaphragm bellows. Vibration damping material 54 is integrally formed with the bellows to fill the outer spaces between the corrugations of the bellows and to cover the bellows. The bellows is welded at each end to flanges 56 and 58 which allow it to be coupled into the system.

For vacuum applications the bellows should be stainless steel of thickness between 0.008 inch and 0.12 inch. Silicon rubbers such as methyl phenyl are particularly suited as the damping material because they can be poured about the bellows in liquid form and then cured.

The stainless steel of which the bellows is formed has a dynamic shear modulus of about $1 \times 10^{12}$ dynes/cm$^2$. Thus, there is little change in dimension, that is strain, of the metal with a given amount of stress. Despite the high dynamic modulus, the corrugated shape of the thin metal results in a relatively low spring constant of the bellows assembly. The bellows configuration does permit significant changing length of the bellows assembly along its axis, but the circumferential length through each cross section of the bellows is maintained constant due to the high dynamic modulus of the metal. Thus, the bellows is free to change in axial length but does not bow inwardly or outwardly with changes in pressure acting radially on the bellows and with collapsing of the bellows.

The damping material 54, on the other hand, is of a synthetic rubber which has a high damping factor, preferably around one, and a relatively low dynamic shear modulus, preferably less than $5 \times 10^6$ dynes/cm$^2$. It, therefore, has a low spring constant regardless of its shape. The material filling the spaces between the bellows corrugations and surrounding the bellows is able to prevent collapse of the bellows when a vacuum is drawn in the vacuum chamber while maintaining the desirable low spring constant. On the other hand, because the bellows is impermeable to gas, the rubber is not subjected to significant radial pressure differentials which might otherwise result in bowing of the damping material.

To prevent wrinkling of the bellows with pressure differentials across the thin metal, it is best that the rubber damping material be securely bonded to the metal continuously along the interface between the two. To that end, it is best to provide an epoxy layer between the metal bellows and the rubber damping material. The epoxy ensures that the rubber is held against the bellows so that it is not squeezed away from the bellows with axial compression of the assembly.

Advantages of the present isolator are its compactness and the simplicity of its assembly into the cryopump. The isolator does not include multiple isolators which must be bolted onto flanges as in the Sundquist system or a bulging elastomer held in place by a metal ring.

Another significant advantage of the present isolator is that it provides damping of all frequencies transmitted into the isolator. In prior isolators in which the elastomeric isolator was separate from the bellows, some vibrations could be transmitted through the bellows with minimal damping. With the damping material integral with the bellows, those vibrations are likely to be absorbed by the damping material. Further, some vibrations transmitted along the bellows follow a path through alternating layers of metal and rubber. Thus, to some extent, the isolator provides the improved damping of constrained layer damping. Because of the radial structural rigidity provided by the bellows, little radial rigidity is required of the rubber material, so a soft thin damping layer can be used.

The typical vibrations produced by a cryopump have both a low frequency component and a high frequency component. The piston stroke of a typical cryopump provides low frequency vibrations, while the high frequency components are due to the vibrations of the stepper motor of the refrigerator and due to the vibrations of the vacuum chamber. The present isolator, as in the case of many typical isolators, can be modeled as a spring-mass system having a spring "constant" and a damping factor dependent on frequency and temperature. In such vibration isolating models the resonant frequency is determined by the relationship $$f_o = (\tfrac{1}{2}\pi)\sqrt{kg/W}$$

where k is the spring constant of the cryopump isolator system, g is acceleration due to gravity, and W is the total force acting on the isolator taking into consideration both the vacuum force and the weight of the cryopump. Any vibration isolating spring scheme has a vibration transmissibility of greater than one for a given resonant frequency $f_o$. Such a system has a lower transmissibility below and above that resonant frequency. Usually vibration frequencies above $\sqrt{2}f_o$ are attenuated (transmissibility is less than 1) while below $\sqrt{2}f_o$ frequency vibration levels are amplified (transmissibility is greater than one). The transmissibility amplitude is determined by the damping factor. High damping factors lower the amplitude at frequencies below $\sqrt{2}f_o$; but the higher damping factor increases the transmissibility above $\sqrt{2}f_o$ relative to a lighter damped system, even though the transmissibility is still less than one. The low frequency components of cryopump vibrations do not need be greatly reduced, so they can be attenuated easily via high-damping rubber-like material, and they are much lower in frequency than the resonant frequency of the vibration isolator so as not to be amplified by the isolator. The high frequency vibration components are well above the resonant frequency and are easily attenuated by the isolator.

The damping material can be of low damping or high damping rubberlike material. The low damping rubberlike materials at room temperatures exhibit low damping factors and provide better isolation where high frequency vibrations are of primary concern. Higher damping materials typically provide better results where lower frequencies near the resonant frequency are a primary concern. As examples, neoprene rubber, natural rubber, SBR rubber (75/25 butadiene-styrene) are filled natural rubber (50 parts by weight of HAF carbon black) exhibit shear moduli and damping factor that vary by a factor of two in the frequency range of 1 Hz to 10,000 Hz. at 35° C. On the other hand, the high-damping rubberlike materials like plasticized polyvinyl butyral resin, thiokol Rd, plasticized polyvinyl acetate and filled butyl rubber (40 parts by weight of MPC carbon black) possess dynamic moduli that increase very rapidly with frequency, and the damping factor is large and again may vary relatively slowly with frequency.

Figure 2:
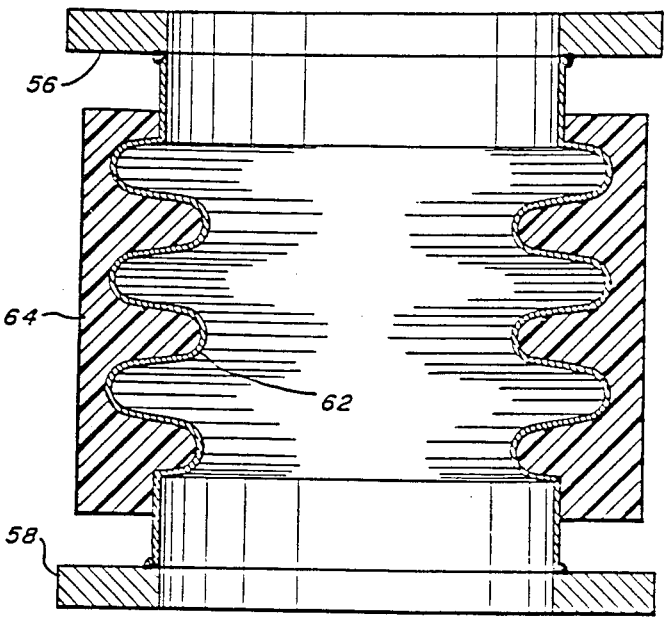
FIG. 2 is an enlarged longitudinal cross sectional view of an alternative convoluted bellows isolator.
Figure 3:
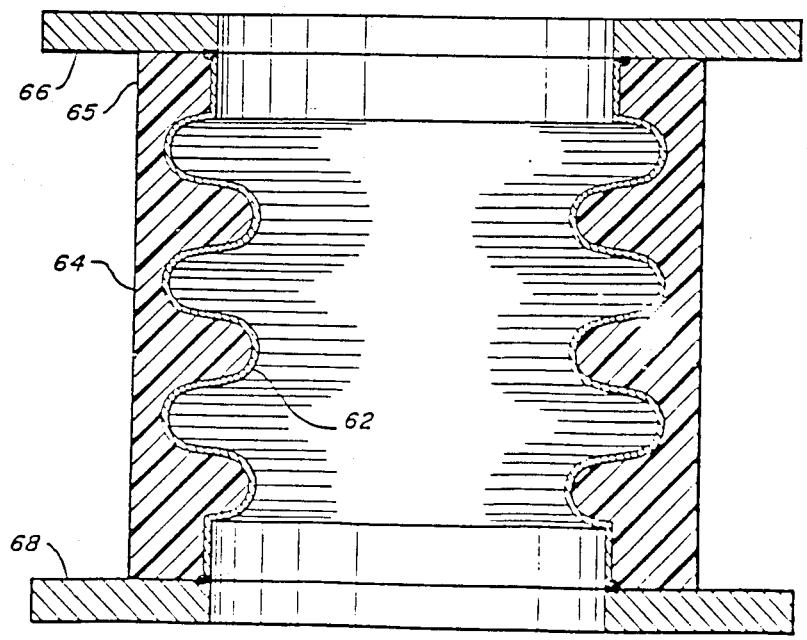
FIG. 3 is a longitudinal sectional view of another convoluted bellows isolator.

The bellows in the isolator of FIG. 1 is formed of welded diaphragms. Alternative isolators having hydroformed convoluted bellows 62 are shown in FIGS. 2 and 3. As before, the outer spaces between corrugations of the bellows are filled with damping material 64 and the entire assembly is surrounded with damping material. In the embodiments of FIGS. 1 and 2 the damping material is spaced from the end flanges to allow access to flanges of minimum diameter. In the embodiment of FIG. 3, larger diameter flanges 66 and 68 are provided and rubber 65 fills the space between the two end flanges. This approach provides some added damping with some increase in the spring constant of the system.

Figure 4:
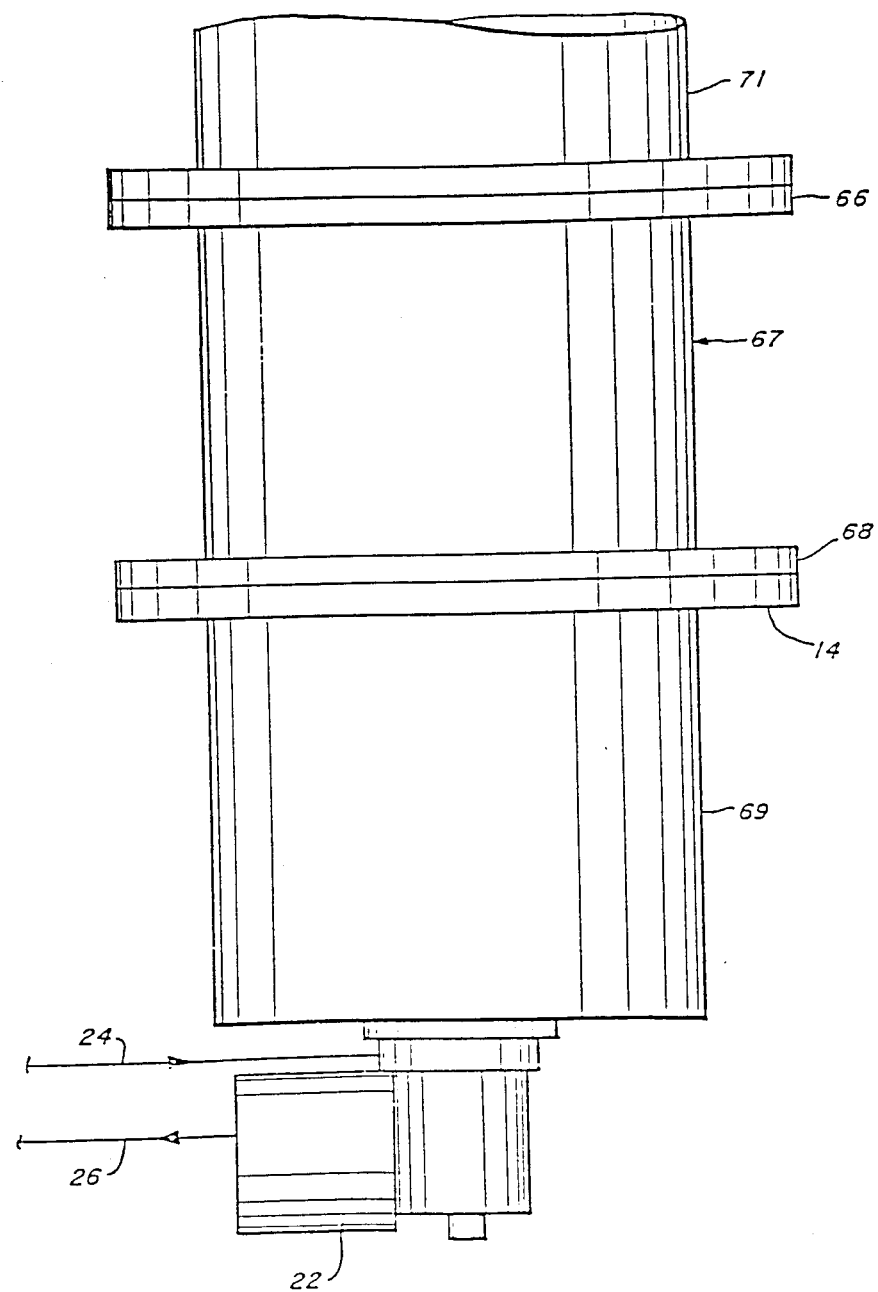
FIG. 4 is a side view of an isolator positioned between the cryopump chamber and the work chamber.

An alternative embodiment of the invention is shown in FIG. 4. In this case, the isolator 67 is positioned between the cryopump vacuum vessel 69 and the work chamber 71. The bellows is required to provide the gas flow path from the work chamber to the cryopump chamber. Such positioning of the vibration isolator is suitable for isolating the work chamber from the refrigerator of smaller cryopumps but becomes cumbersome with large diameter cryopumps.

Figure 5:
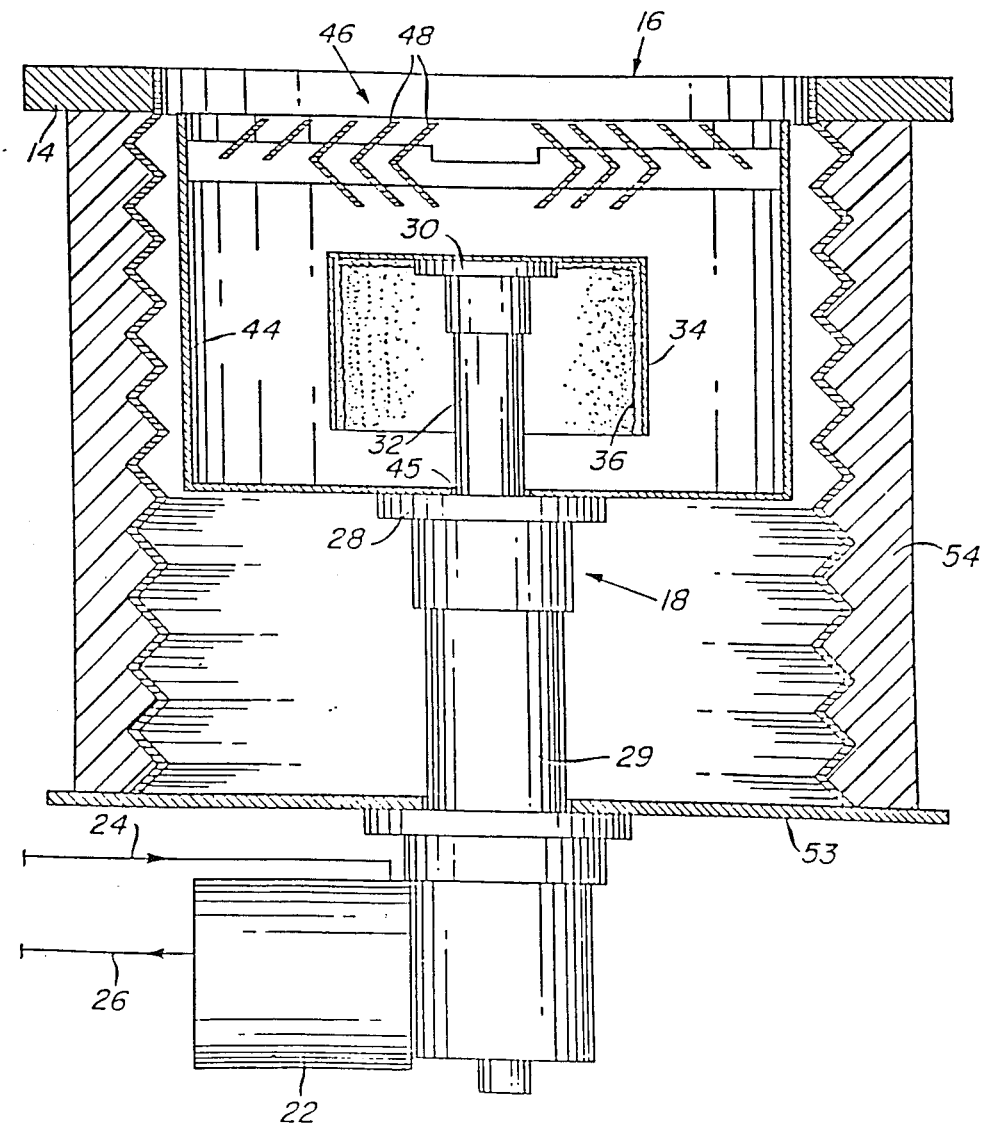
FIG. 5 is a longitudinal sectional view of the cryopump chamber employing an isolator as a vacuum chamber.

Embodied in FIG. 5 the insulator having convoluted bellows is shown as the cryopump's vacuum vessel. As before, damping material fills the outer spaces between corrugations of the bellows as well as the entire assembly.

When the cryopump is not in operation, pressure inside and outside the vacuum vessel are equal, and the vessel is either fully extended or resting on its own weight depending on the attachment orientation of the cryopump. During operation, however, a compressional force is applied to the vessel because of the greater outside atmospheric pressure. This force is resisted by the soft rubber between each bellows, thus rendering the vacuum vessel fully operational and behaving as a vibration isolator.

Figure 6:
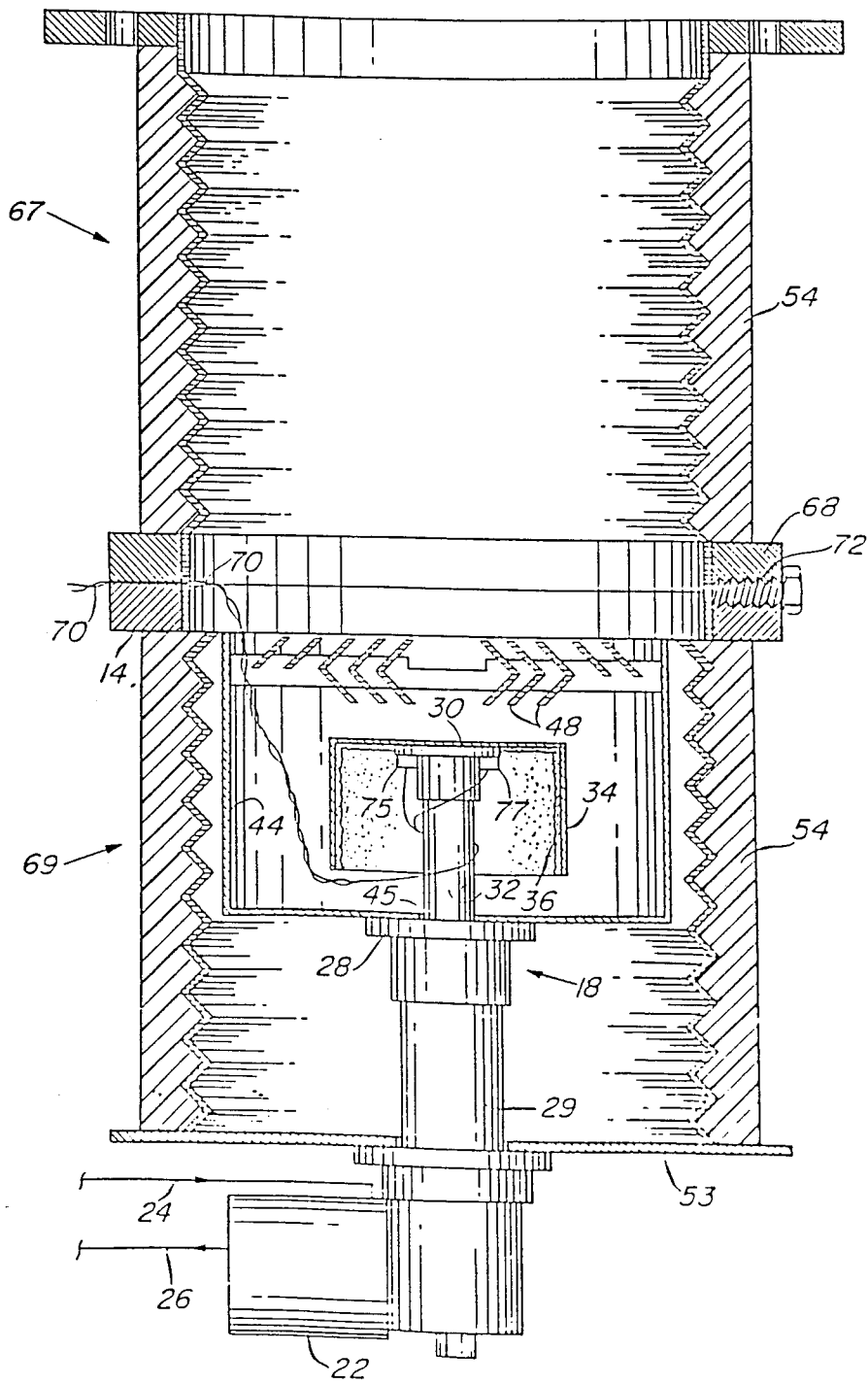
FIG. 6 is a longitudinal sectional view of a pair of isolators connected in series.

With either position of the vibration isolator described above, vibration can be further reduced by connecting a second vibration isolators in series with the first as shown in FIG. 6. The two vibration isolators 67 and 69 may be of like or different diameters. In this case one isolator 69 serves as the vacuum vessel 12 while the second isolator 67 is positioned between the cryopump vacuum vessel and the work chamber. Alternatively, the refrigerator may be mounted to the first vibration isolator forming the vacuum vessel 12, as described above, through a second vibration isolator 51. This embodiment is shown in FIG. 7.

Figure 7:
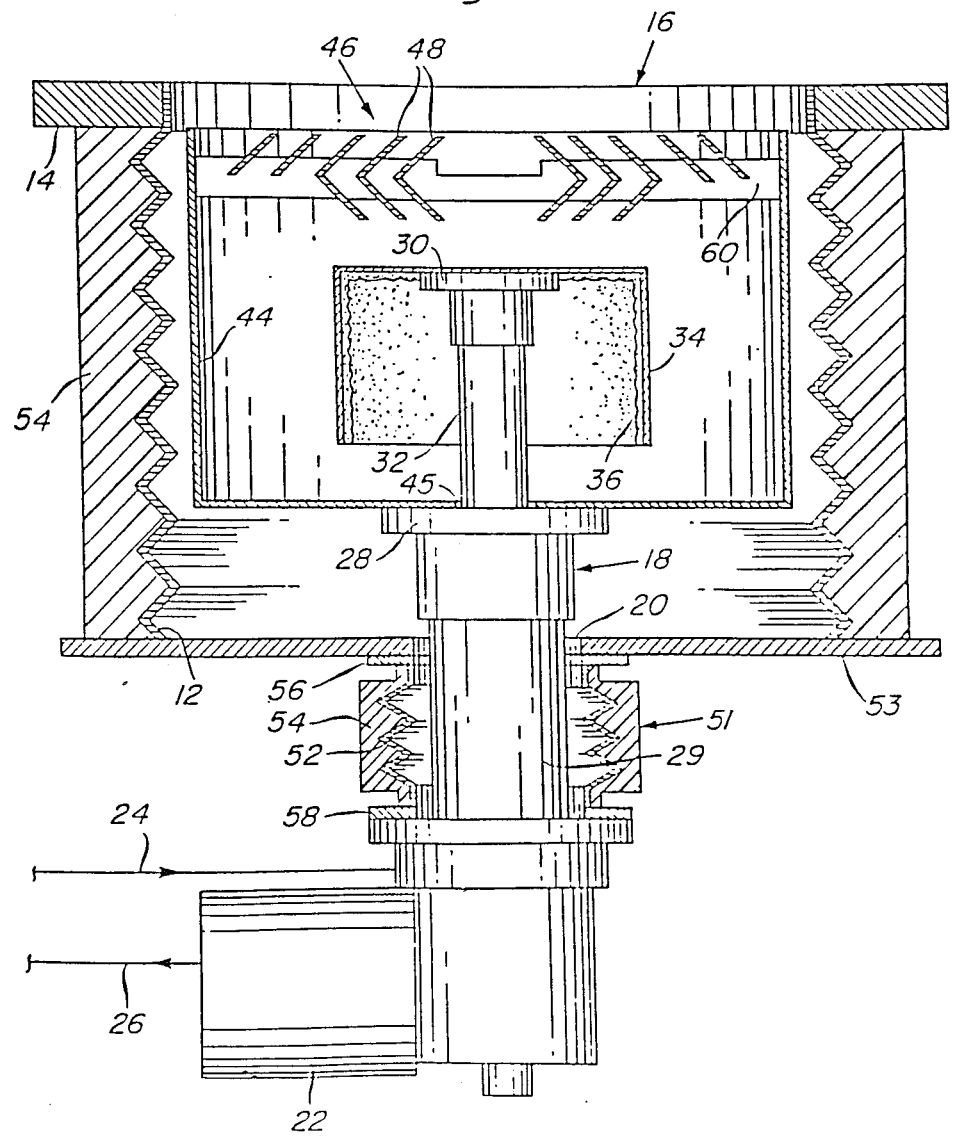
FIG. 7 is a longitudinal sectional view of an alternative pair of isolators connected in series.

The two vibration isolators shown in FIGS. 6 and 7 are joined at their respective flanges. The joined flanges serve as a weighted intermediate mass which provides for further vibrational attenuation by creating a two degree of freedom system having two resonant frequencies. By increasing the weight of intermediate mass relative to the system's mass the higher of the two resonant frequencies can be lowered. The weight of the intermediate mass may vary, however, depending on the operating frequency of the system in order to avoid one of the resonant frequencies from equaling the operating frequency. If the weight of the intermediate mass is properly chosen it can operate as a dynamic absorber, vibrating directly out of phase with one of the vibrational modes of the cryopump.

Figure 8:
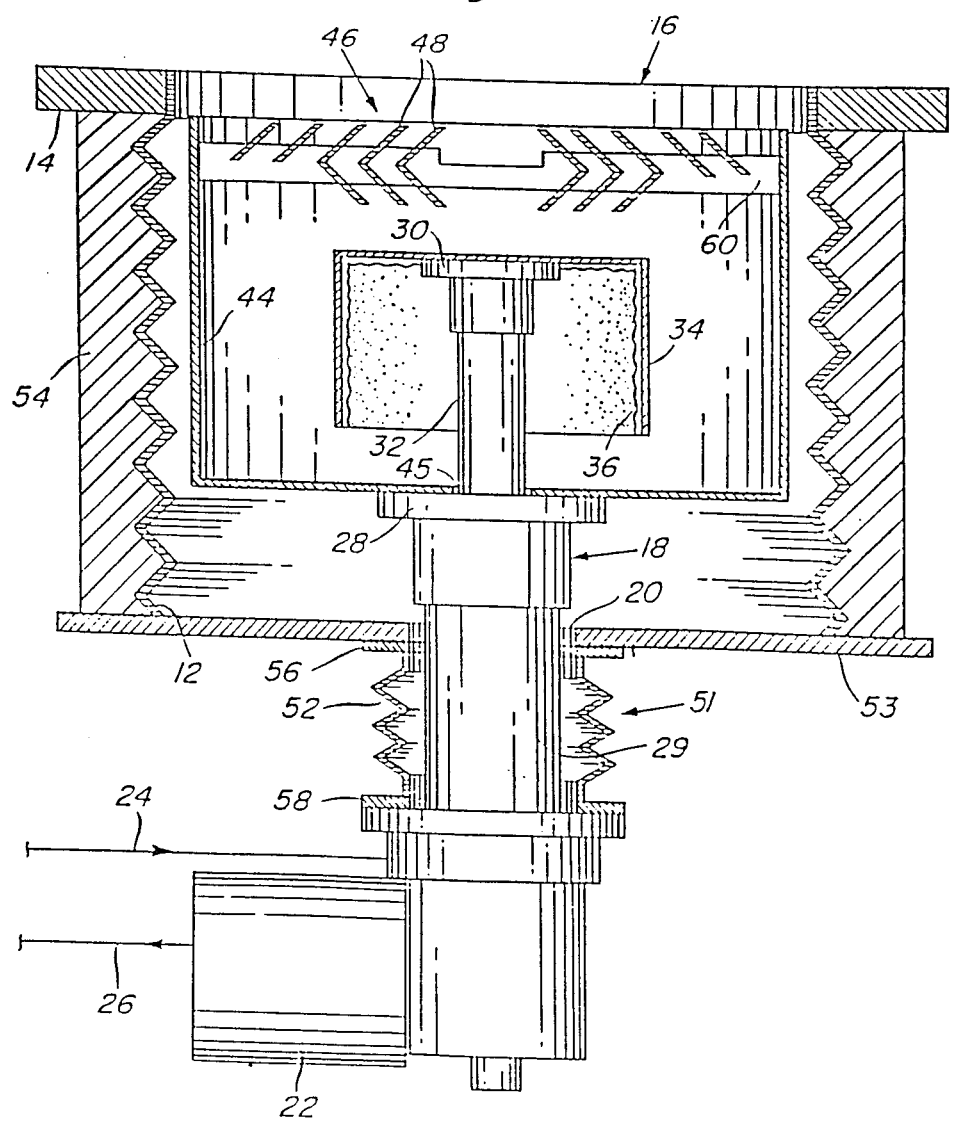
FIG. 8 is a longitudinal sectional view of an alternative embodiment of the invention having one damped isolator and one undamped isolator forming a cryopump housing.

An alternative method for controlling the resonant frequencies is accomplished by removing the damping material surrounding one of the isolators as shown in FIG. 8. By removing the damping material surrounding the bellows positioned between the refrigerator and the vacuum chamber, the spring constant of that isolator is lowered. This results in the lowering of the lowest resonant frequency. To prevent collapse of the bellows when a vacuum is drawn in the vacuum chamber, weight may be added to the refrigerator. Preferably, the combined weight of the refrigerator and the added weight is 30 to 35 pounds for a refrigerator which operates at 53 to 60 Hz. By removing the damping material from the smaller diameter bellows, rather than the larger diameter bellows, the weight required to prevent the bellows from collapsing is minimized.

An added advantage of providing an intermediate mass is that wires 70 for suitable temperature sensor and vapor pressure sensor elements 75 and 77 may be inserted though the intermediate mass. Vibration traveling along these wires from the external environment is absorbed by the intermediate mass, thus eliminating vibration that would otherwise be transmitted to the system. Similarly, a value port 72 connecting the vacuum changer to a roughing pump (not shown) is incorporated into the intermediate mass to eliminate vibration transmitted to the system from the external environment.

Figure 9:
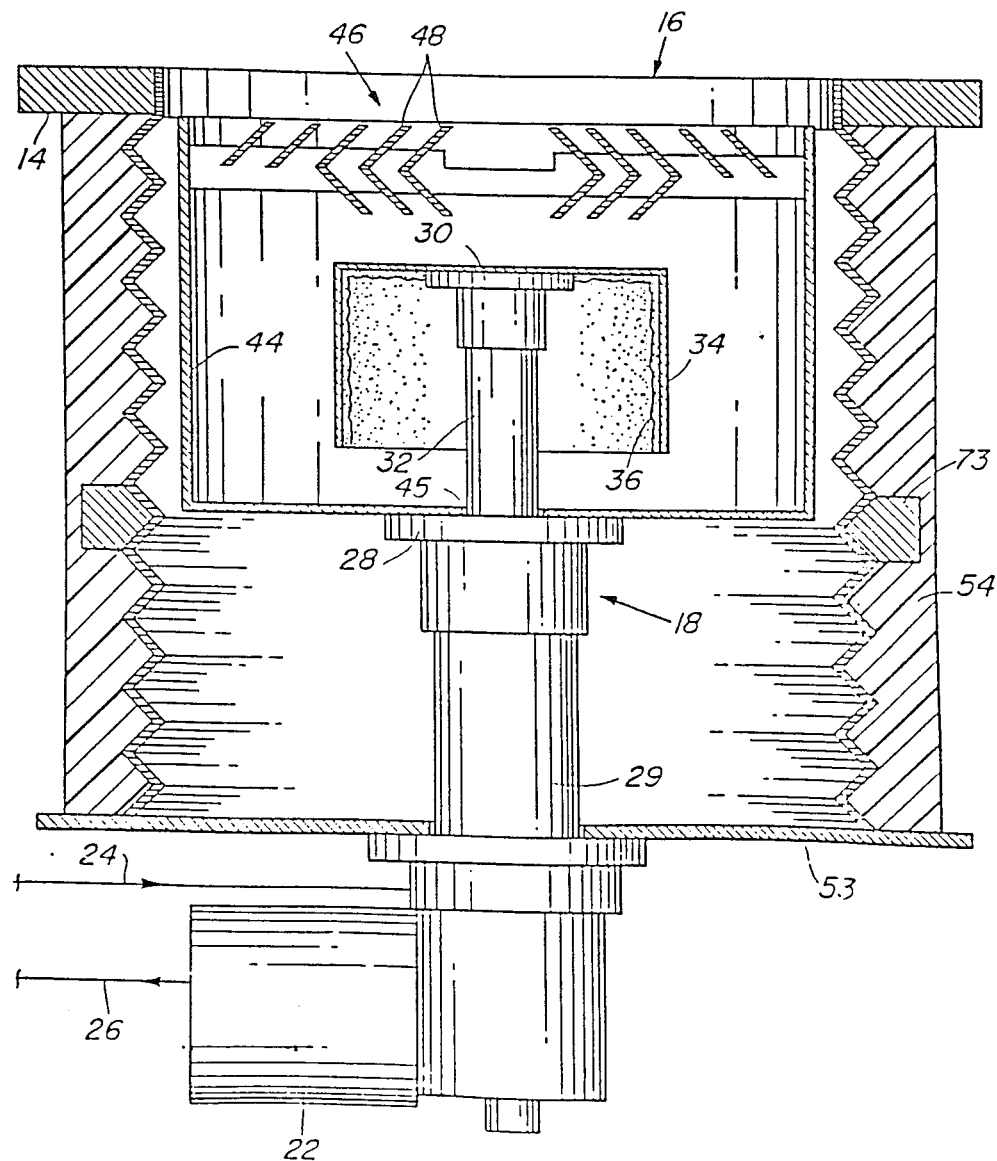
FIG. 9 is a longitudinal sectional view of a second alternative embodiment of the invention having a collar placed between one of the corrugations of the bellows.

In FIG. 9, a collar 73 is placed between one of the corrugations of the bellows. This collar serves as an intermediate weighted mass and may be placed in any one of the corrugations along the bellows. The purpose of the collar is to separate the bellows into two bellows for creating a two degree of freedom system discussed above. By splitting the bellows into two bellows having different lengths, different frequencies can be attenuated. Damping material filling, the outer spaces between the corrugations of the bellows and the collar further attenuates vibration.

A preferred embodiment of the vibration isolation system utilizes another dynamic absorber system, in place of or in addition to, the intermediate mass discussed above, to reduce the transmittance of mechanical vibrations generated by one or more moving elements operating within the cryopump.

Figure 10:
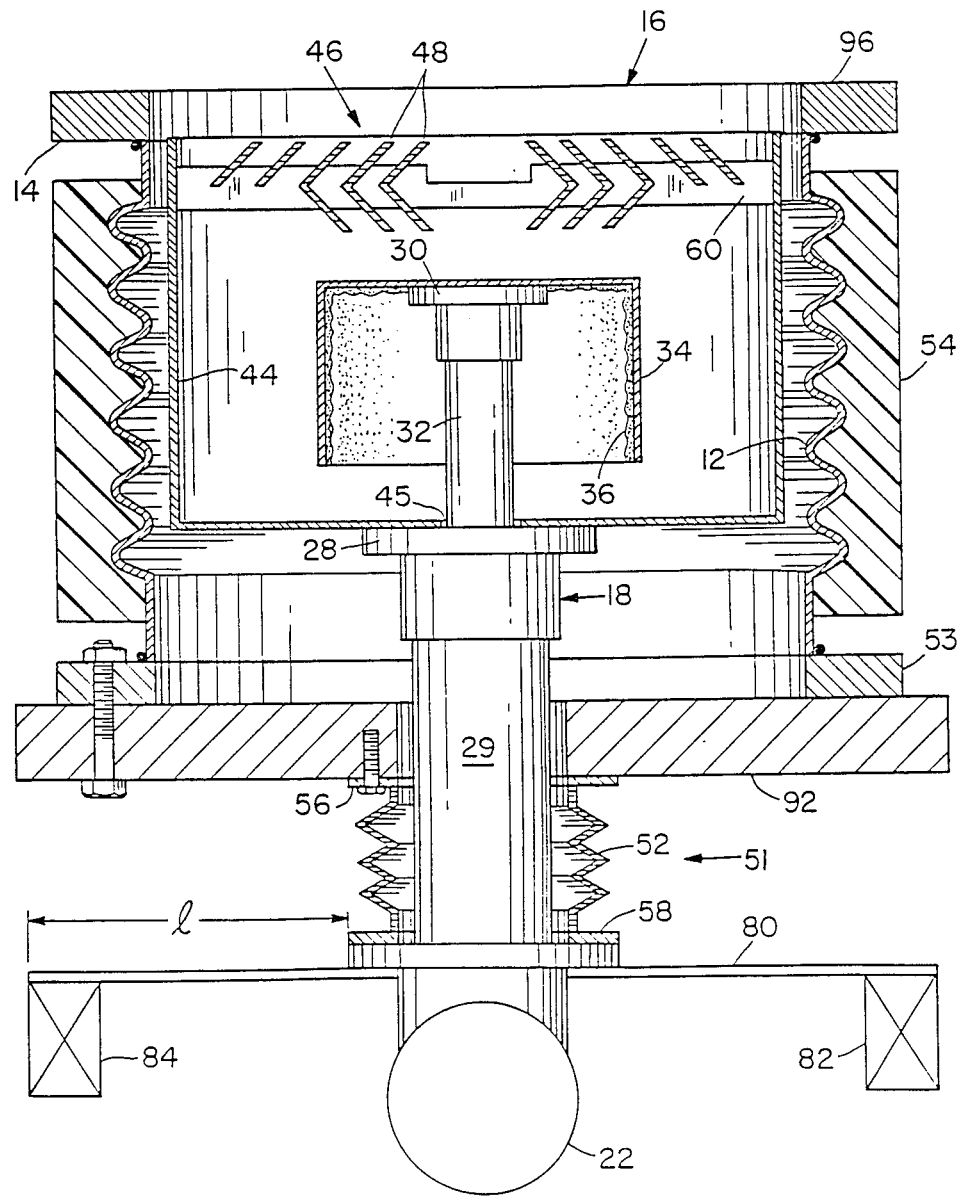
FIG. 10 is a longitudinal sectional view of a preferred embodiment of the invention utilizing a dynamic absorber.

Such a dynamic absorber is illustrated in FIG. 10. A cantilevered beam 80 with its center mounted between the drive unit 22 of the compressor and the welded bellows 52, vibrates directly out of phase with the vibration being attenuated. Two masses 82 and 84 of mass $m_w$ are mounted adjacent the two ends of beam 80.

The moment about each end of the beam having a moment arm of length l and mass $m_b$ can be adjusted such that a natural frequency of the beam matches the frequency of operation of the vibration of the drive unit of the cryopump.

The natural frequency of vibration of a cantilevered beam mounted at one end and a mass $m_w$ mounted at the free end of the beam can be determined using the equation:

$$\frac{1}{W_1^2} = \frac{1}{W_2^2} + \frac{1}{W_3^2},$$

where $W_1$ is the natural frequency of the beam and the mass $m_w$, $W_2$ is the natural frequency of the beam of having a mass $m_b$ and length l, and $W_3$ is the natural frequency of the mass $m_w$, that is attached to a beam that is assumed to be weightless. As $W_2$ and $W_3$ are known for any given system, $W_1$ can be calculated therefrom. It is known that:

$$W_2^2 = (3.515)^2 \frac{EI}{m_b l^3} \text{ and that}$$

$$W_3^2 = \frac{3 EI}{m_w l^3}$$

where E is Young's modulus, and $$I = \frac{lh^3}{12}$$

is the moment of inertia for a beam of length l and thickness h.

Thus, the natural frequency f of the dynamic absorber is $$f = W_1 2\pi$$

where $$W_1^2 = \frac{3EI}{m_w l^3 \left(1 + \frac{3m_b}{(3.515)^2 m_w}\right)}$$

Thus, for example, by adjusting the magnitude of the mass $m_w$ or by varying the distance l at which the mass $m_w$ is mounted relative to the fixed end of the beam, the natural frequency of vibration of the system can be accurately controlled so that it matches the frequency of operation of the drive unit.

The embodiment of FIG. 10 incorporates a intermediate mass 92 which operates similar to the intermediate mass described in reference to FIG. 6 above. That is, the mass 92 can be selected to operate as a dynamic absorber where it vibrates out of phase with one of the vibrational modes of the cryopump. The mass 92 also provides ports for purging and for thermocouples which monitor temperatures within the cryopump.

Figure 11:
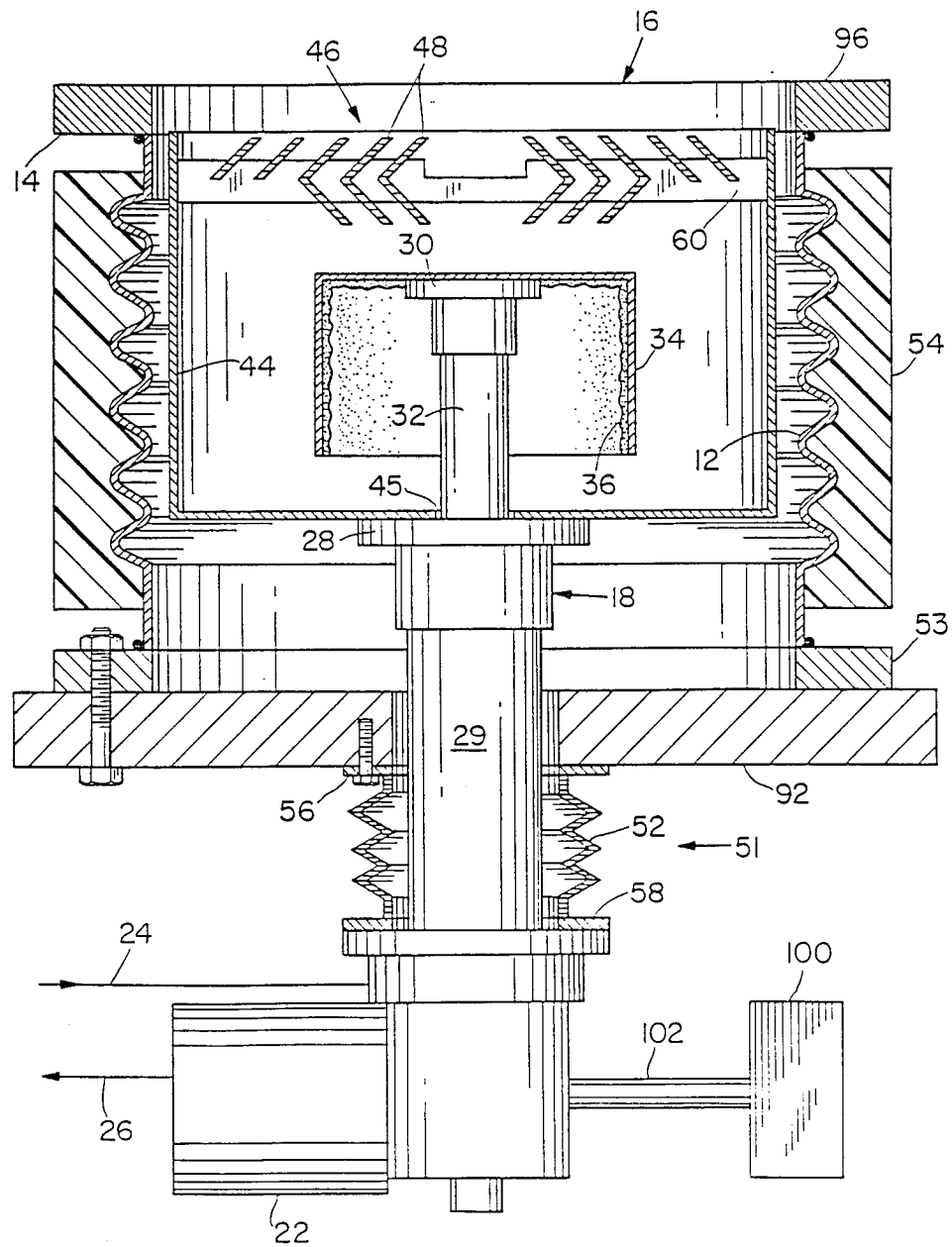
FIG. 11 is a longitudinal sectional view of the exterior of the cryopump of FIG. 10 showing a mass mounted opposite the motor to balance the system.

FIG. 11 is a side view of the drive unit and displacer housing over the cryopump without showing the dynamic absorber 80. This view shows an additional counterbalance mass 100 mounted on beam 102 to the displacer housing 91 opposite the motor housing 22.

The mass 100 is designed to aid in the balancing of the system about the vertical axis of the vacuum vessel by eliminating the displacement of the cryopump to one side of the axis due to the weight of the motor 22. Without the mass 100 this displacement can result in a rotational vibration of the unit. The mass 100 also acts as a dynamic absorber which can be tuned to vibrate at a frequency which is generated by the operation of the drive unit.

The counterbalance system also adjusts for forces resulting from the evacuation of the system. The three masses 82, 84 and 100, in addition to the mass of the motor, tend to expand the bellows 52 which, without the presence of the additional weight, would be compressed as a result of the vacuum forces exerted by the atmosphere on the outer surface of the bellows 52. This enhances the vibration isolation characteristics of the bellows 52 which are not supported by the damping material 54 positioned about the upper bellows 12.

While the invention has been particularly shown and described with reference to a preferred embodiment thereof, it will be understood by those skilled in the art that various changes in form and details may be made therein without departing from the spirit and scope of the invention, as defined by the appended claims. For example, the length of the isolator depends on the desired vibration isolation. The longer the length, the lower the frequencies that will be attenuated.

We claim:

1. A dynamic absorber for absorbing vibrations of a cryopump comprising:
    a cryopump having a motor that generates a vibration at a specific frequency; and
    a dynamic absorber secured to the cryopump such that the absorber vibrates out of phase with the vibration of the cryopump to attenuate that vibration.

2. The dynamic absorber of claim 1 wherein the dynamic absorber comprises a cantilevered beam.

3. The dynamic absorber of claim 2 further comprising an adjustable mass secured to the beam such that the beam vibrates at a natural frequency that is adjusted to match an operating frequency, or a harmonic thereof, of the cryopump.

4. The dynamic absorber of claim 3 wherein the mass is distributed adjacent the two ends of the beam.

5. The dynamic absorber of claim 1 wherein the dynamic absorber comprises a plurality of cantilevered beams.

6. The dynamic absorber of claim 5 further comprising a dynamic absorber that couples a vacuum vessel of the cryopump with a motor of the cryopump.

7. A vibration isolator comprising:
    bellows having corrugations, damping material secured to the corrugations of the bellows along a length of the bellows for absorbing vibrations transmitted along the bellows; and
    a dynamic absorber secured to the bellows for attenuating vibrations of a predetermined frequency being transmitted along the bellows.

8. The vibration isolator of claim 7 further comprising a second undamped bellows joined in series with the first bellows and wherein the first and second bellows are separated by the dynamic absorber.

9. The vibration isolator of claim 8 wherein the dynamic absorber comprises a coupler for securing the first and second bellows.

10. The vibration isolator of claim 7 wherein the dynamic absorber comprises a cantilevered beam.

11. The vibration isolator of claim 7 wherein the dynamic absorber comprises a plurality of cantilevered beams.

12. The vibration isolator of claim 11 further comprising a plurality of adjustable masses, each secured to one of said beams such that the beams vibrate at frequencies adjusted to match frequencies being transmitted along the bellows.

13. The vibration isolator of claim 8 further comprising a second dynamic absorber comprised of a cantilevered beam.

14. A vibration isolator comprising:
    a first bellows having corrugations and a damping material secured to the corrugations of the bellows along a length of the bellows for absorbing vibrations transmitted along the belllows;
    a dynamic absorber secured to the first bellows for attenuating vibrations of a predetermined frequency being transmitted along the bellows; and
    a second undamped bellows joined in series with the first bellows such that the first and second bellows are separated by the dynamic absorber.

15. The vibration isolator of claim 14 wherein the dynamic absorber comprises a coupler for securing the first and second bellows.

16. A vibration isolation system for a cryopump comprising:
    a cryopump having a motor that generates a vibration of specific frequency;
    a bellows assembly to which the motor of the cryopump is secured for attenuating vibrations transmitted along the bellows; and
    a dynamic absorber secured to the bellows assembly to attenuate vibrations associated with the cryopump.

17. The vibration isolation system of claim 16 further comprising a damping material secured to the bellows.

* * * * *